United States Patent [19]

Snyder Best Available Copy

[11] 4,169,843

[45] Oct. 2, 1979

[54] METHOD FOR HYDROGENATION

[75] Inventor: Eugene I. Snyder, Mt. Prospect, Ill.

[73] Assignee: Kraft, Inc., Glenview, Ill.

[21] Appl. No.: 811,167

[22] Filed: Jun. 29, 1977

[51] Int. Cl.[2] ........................... C11C 3/12; A23B 4/04

[52] U.S. Cl. .................................... 260/409; 426/313; 426/607; 252/439

[58] Field of Search ................. 260/409; 426/607, 313

[56] References Cited

U.S. PATENT DOCUMENTS

| | | | |
|---|---|---|---|
| 2,468,799 | 5/1949 | Ziels et al. | 260/409 |
| 3,790,608 | 2/1974 | Caverly et al. | 260/409 |
| 3,856,831 | 12/1974 | Tateishi et al. | 260/409 |

*Primary Examiner*—John Niebling
*Attorney, Agent, or Firm*—Fitch, Even & Tabin

[57] ABSTRACT

A method for the hydrogenation of liquid oils, particularly vegetable oils is provided. In the method, a catalyst system is used which results in producing a hydrogenated oil product having a steep SFI slope with complete melting by about 40° C. The final product has less than about 10 percent stearate, less than about 7 percent diene and greater than about 60 percent trans isomer level. The catalyst system is a mixture of a conventional nickel catalyst and a sulphur-poisoned nickel catalyst. The hydrogenation process can be a dead-end process or can be an end-point process.

3 Claims, 2 Drawing Figures

METHOD FOR HYDROGENATION

The present invention relates generally to the hydrogenation of vegetable oils. More particularly, the present invention is directed to the use of a catalyst system in a single stage hydrogenation process to provide a hydrogenated fat having high solids at room temperature and little or no solids at body temperature.

Cocoa butter has unique physical properties among the natural hard fats and is the principal fat used in the manufacture of confectionery products. Manufactured hydrogenated fats having physical properties similar to cocoa butter are highly desirable. Such fats require the physical property of high solids at ambient room temperature with little or no solids at body temperature. This results in providing a fat with a steep Solid Fat Index (SFI) slope. Such fats have been produced by fractionation and no convenient, general single-stage process is presently available for directly preparing such fats with high quality by a single stage hydrogenation process. Sulphur-poisoned catalysts have been used to provide this type of fat in a two-stage hydrogenation process.

It would be desirable to provide a single-stage hydrogenation process for the preparation of fats having a steep SFI slope, high solids at ambient temperature and little or no solids at body temperature. It would be desirable to provide such hydrogenated fats by the hydrogenation of liquid animal or vegetable oils. To obtain hydrogenated fats with a steep SFI slope and little or no solids at body temperature from liquid oils, however, requires that the final product have less than about 10 percent stearate, less than about 7 percent diene and greater than about 60 percent trans isomer level. Trans isomer level is defined as the percentage of trans double bonds compared to the total number of carbon to carbon double bonds.

Conventional nickel catalysts easily reduce diene level to about 8 percent with low stearate accumulation. However, further reduction of diene is accompanied by unacceptably high stearate formation. Trans isomer levels under most operating conditions using conventional nickel catalysts are moderate, i.e., less than about 50 percent.

Sulphur-poisoned catalysts (elaidinization catalysts) have been used to hydrogenate vegetable oils without high stearate formation and with high trans isomer levels. However, hydrogenation with sulphur-poisoned catalysts produce diene levels about about 10 percent and the resulting product is not suitable without a separate process step to reduce the diene level. The use of conventional nickel catalysts for hydrogenation followed by the step of isomerization using sulphur-poisoned catalysts accompanied by additional diene reduction is known as the "two-stage" process for preparation of hard fats. The two-stage process is cumbersone and is uneconomical because of the necessity of using a separate step to reduce diene level.

Accordingly, it is a principal object of the present invention to provide a one-stage process to hydrogenate liquid oils and to obtain a hydrogenated fat product having physical properties similar to cocoa butter.

It is another object of the present invention to provide a catalyst system for hydrogenation of vegetable oils.

It is a further object of the present invention to provide a catalyst system which can be used in a one-stage hydrogenation process to provide a hydrogenated vegetable oil having less than about 7 percent diene, less than about 10 percent stearate, greater than about 60 percent trans isomer and having a steep SFI slope with complete melting by about 40° C.

These and other objects of the present invention will become more apparent from the following detailed description and the accompanying drawings wherein.

Figure 1:
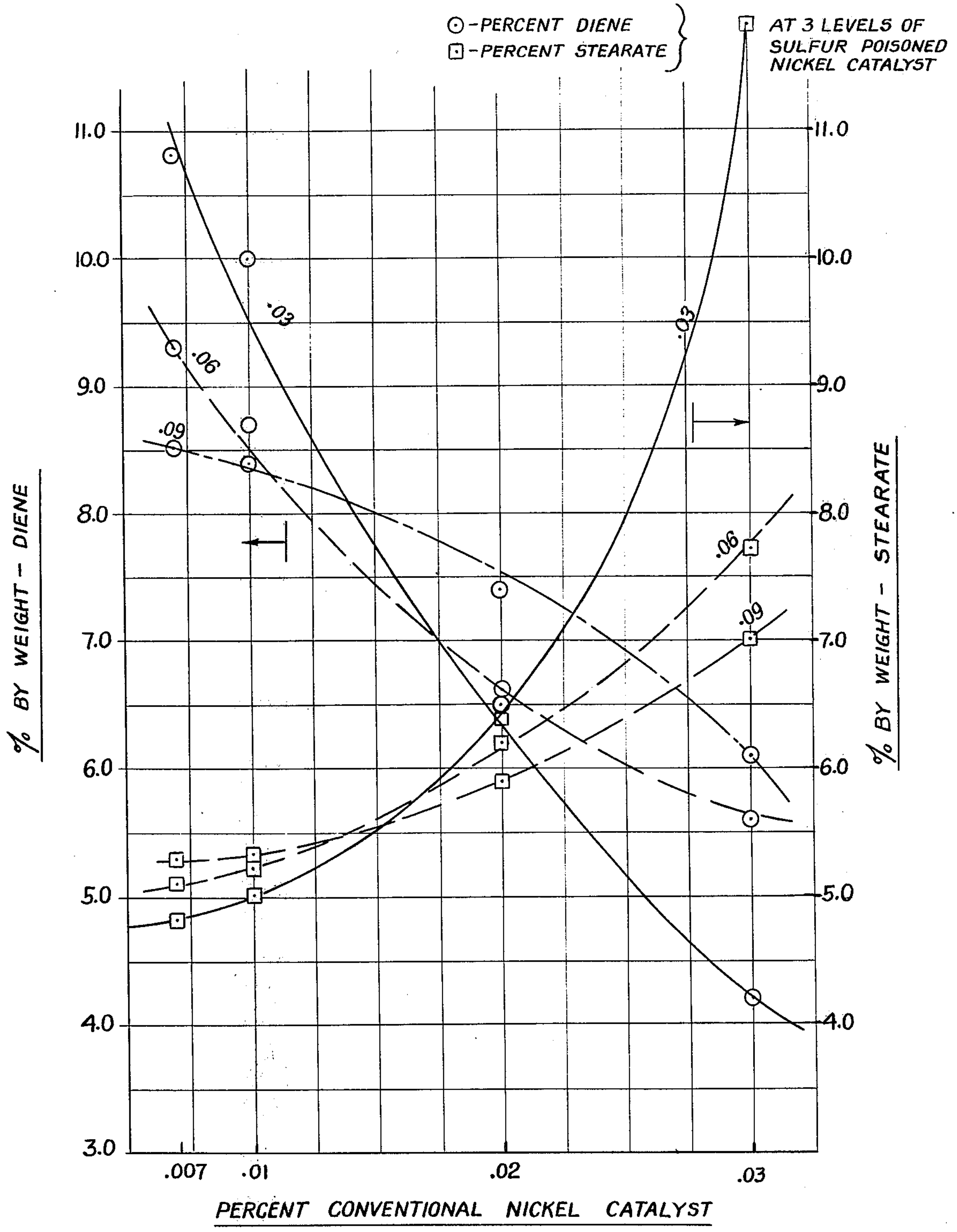
FIG. 1 is a graph showing levels of diene and stearate formation using varying levels of conventional nickel catalyst at three different levels of sulphur-poisoned catalyst.

In general, the present invention is directed to a method for the hydrogenation of liquid oils, particularly vegetable oils. In the method, a catalyst system is used which results in producing a hydrogenated oil product having a steep SFI slope with complete melting by about 40° C. The final product has less than about 10 percent stearate, less than about 7 percent diene and greater than about 60 percent trans isomer level. The catalyst system is a mixture of a conventional nickel catalyst and a sulphur-poisoned nickel catalyst. The hydrogenation process can be a dead-end process or can be an end-point process.

The starting oil can be any liquid, or partially hydrogenated animal or vegetable oil having an IV of from about 90 to about 135.

It is a significant feature of the present invention that naturally occurring vegetable oils can be used as the starting material in the process of the invention without prior hydrogenation, fractionation or other treatment to produce a particular modified material. This is in contrast to the two-stage process which requires separate hydrogenation and diene reduction steps.

Finely divided metallic nickel catalysts are well known for use in the hydrogenation of vegetable oils. Such catalysts are usually deposited on carriers such as Kieselguhr, aluminum oxide, silicate and the like.

The sulphur-poisoned catalyst useful in the catalyst system of the present invention can be prepared by any suitable method. One known method for preparing sulphur-poisoned catalyst is described in U.S. Pat. No. 3,856,831 to Tateishi et al. The Tateishi patent describes the preparation of sulphur-poisoned catalysts utilizing hydrogen sulfide gas. The sulphur-poisoned catalyst can be prepared by subjecting a conventional reduced nickel hydrogenation catalyst to an atmosphere containing hydrogen sulfide for sufficient time to obtain the desired sulphur content. Also, the catalyst can be prepared by subjecting a nickel compound, such as the oxides, hydroxides or carbonates, to a reduction reaction and then placing the reduced catalyst in a mixed gas stream containing hydrogen and hydrogen sulfide until the desired sulphur content is obtained. Either wet-reduced nickel catalyst or dry-reduced nickel catalyst can be used.

A preferred method for preparing the sulphur-poisoned catalyst is to mix from about 5 to about 25 percent nickel catalyst into melted hardened coconut oil (IV less than 1). The mixture is then heated to a temperature in the range of from about 70° C. to about 90° C. Thereafter, the desired content of elemental sulphur is added and the mass is quickly heated to a temperature of about 180° C. while being stirred in a nitrogen atmosphere. The liquid mass is maintained at a temperature of from about 180° to 210° C. for about 1 hour. Thereafter, the mass is cooled while being stirred to provide a uniform catalyst mixture.

Sulphur-poisoned nickel catalysts useful in the catalyst system of the present invention contain from about 5 to about 20 percent sulphur based on the nickel present in the sulphur-poisoned catalyst portion of the catalyst system.

The conventional nickel catalyst is used at a level of from about 0.007 percent to about 0.03 percent based on the level of oil. The sulphur-prisoned catalyst is used at a level of from about 0.02 percent to about 0.10 percent based on the level of oil. The ratio of conventional catalyst to sulphur-poisoned catalyst is within the range of from about 0.1:1 to about 1:1, preferably from about 0.2:1 to about 0.6:1.

Typical hydrogenation conditions are used to effect hydrogenation in accordance with the invention. In general, a temperature in the range of from about 190° to about 235° C. for a time of from about 2 to about 5 hours and a hydrogen pressure of from about 103 to about 1030 mm. Hg. gauge are used.

Figure 2:
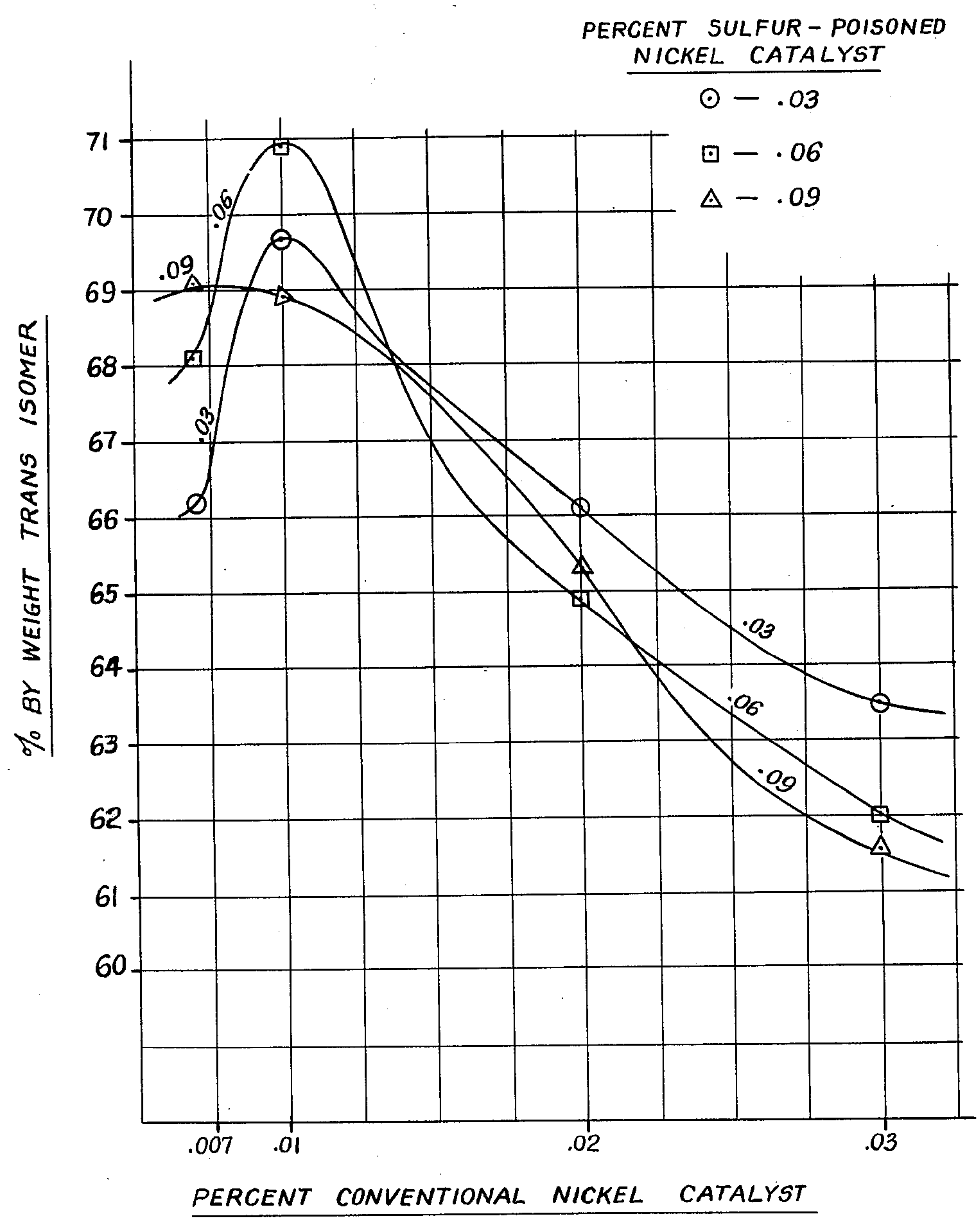
FIG. 2 is a graph showing trans isomer formation at varying levels of conventional nickel catalyst at three different levels of sulphur-poisoned catalyst.

As can be seen from FIGS. 1 and 2 it is desirable to use a low level of conventional nickel catalyst and a high level of sulphur-poisoned catalyst within the indicated range to achieve a desirable high trans isomer content. It is desirable to use a high level of conventional nickel catalyst within the indicated range to achieve a low diene content. The relative importance of these competing goals can be balanced and a choice of catalyst ratio and catalyst content within the indicated range can be selected to achieve the desired final product.

The following examples further illustrate various features of the present invention, but are not intended to limit the scope of the invention which is defined in the appended claims.

EXAMPLE

An oil blend containing 20 percent palm oil and 80 percent soy bean oil was prepared. The oil blend had an IV of about 115, a diene content of about 44 and a cis isomer level of 100 percent based on the unsaturates. The oil blend was placed in a hydrogenation chamber and the temperature was increased to 219° C. The initial exothermic reaction produced a temperature of 227° C. Hydrogen pressure was maintained at 258 mm. Hg. gauge throughout. The reaction was continued for 5 hours. Several runs were made utilizing four different levels of conventional nickel catalyst of 0.007 percent, 0.01 percent, 0.02 percent and 0.03 percent. At each level of use of conventional nickel catalyst, three different levels of sulphur-poisoned catalyst were used, these being 0.03 percent, 0.06 percent, and 0.09 percent. The catalysts were selected from the same batch for all runs.

The results of the various runs are set forth hereinbelow in Table 1. These results were used to plot the graphs set forth in FIGS. 1 and 2.

TABLE I

| EXPT. NO. | CONVENTIONAL CATALYST % Ni | S-CONTAINING CATALYST % Ni | RETRACTIVE INDEX (60° C.) | 16:0 | 18:0 | 18:1 | 18:2 | trans* double bonds | SFI 50 | 70 | 80 | 92 | 100 | 104 |
|---|---|---|---|---|---|---|---|---|---|---|---|---|---|---|
| 1 | 0.007 | 0.03 | 41.65 | 16.5 | 4.8 | 67.4 | 10.8 | 66.2 | | | | | | |
| 2 | | 0.06 | 41.40 | 16.5 | 5.1 | 68.6 | 9.3 | 68.1 | | | | | | |
| 3 | | 0.09 | 41.14 | 16.5 | 5.3 | 68.9 | 8.5 | 69.1 | | | | | | |
| 4 | 0.01 | 0.03 | 41.49 | 16.5 | 5.0 | 68.0 | 10.0 | 69.7 | | | | | | |
| 5 | | 0.06 | 41.20 | 16.4 | 5.2 | 68.8 | 8.7 | 70.9 | 57 | 44 | 35 | 13 | 0.2 | 0 |
| 6 | | 0.09 | 41.0 | 16.4 | 5.3 | 69.1 | 8.4 | 68.9 | 58 | 45 | 37 | 14 | 0.4 | 0 |
| 7 | 0.02 | 0.03 | 40.78 | 16.7 | 6.4 | 69.9 | 6.5 | 66.1 | 62 | 50 | 43 | 19 | 2.5 | 0 |
| 8 | | 0.06 | 40.78 | 16.6 | 6.2 | 69.9 | 6.6 | 64.9 | 61 | 49 | 42 | 19 | 2.5 | 0 |
| 9 | | 0.09 | 40.90 | 16.5 | 5.8 | 69.6 | 7.4 | 65.3 | 59 | 47 | 39 | 16 | 1.4 | 0 |
| 10 | 0.03 | 0.03 | 39.80 | 16.6 | 11.9 | 66.9 | 4.2 | 63.5 | 67 | 59 | 55 | 36 | 19 | 8 |
| 11 | | 0.06 | 40.31 | 16.5 | 7.7 | 69.7 | 5.6 | 62.0 | 64 | 54 | 47 | 25 | 8 | 0.3 |
| 12 | | 0.09 | 40.48 | 16.4 | 7.0 | 69.8 | 6.2 | 61.6 | 63 | 52 | 45 | 23 | 6.5 | 0 |

*% of all double bonds which are trans $= \frac{\%\ \text{trans}}{\%\ \text{monoene} + 2 \times \%\ \text{diene}}$ The above described selectively hydrogenated vegetable oils are useful as a substitute for cocoa butter and butter fat in confectionery products. The hydrogenated vegetable oils provide fats which melt over a narrow range, remaining hard at ambient temperature, but melting completely in the mouth without imparting greasy or waxy organoleptic properties. The fats have an initial gloss, or sheen, with good gloss retention throughout shelf life and do not require tempering.

What is claimed is:

1. A single stage process for preparing a hydrogenated liquid oil which comprises hydrogenating a liquid oil having an IV of from about 90 to about 135 in the presence of a catalyst system, said catalyst system comprising from about 0.007 to about 0.03 percent by weight based on the level of oil of a conventional nickel catalyst and from about 0.02 to about 0.10 percent by weight based on the level of oil of a sulphur-poisoned catalyst wherein the ratio of conventional nickel catalyst to sulphur-poisoned catalyst is within the range of from about 0.1:1 to about 101 whereby a hydrogenated oil is provided having greater than about 60 percent trans isomer, less than about 7 percent by weight diene and less than about 10 percent by weight stearate without fractionation.

2. A process in accordance with claim 1 wherein said sulphur-poisoned catalyst has from about 5 to about 20 percent by weight sulphur based on the weight of nickel present in the sulphur-poisoned catalyst.

3. A process in accordance with claim 1 wherein said ratio is within the range of from about 0.2:1 to about 0.6:1.

* * * * *

UNITED STATES PATENT AND TRADEMARK OFFICE

CERTIFICATE OF CORRECTION

PATENT NO. : 4,169,843

DATED : October 2, 1979

INVENTOR(S) : Eugene I. Snyder

It is certified that error appears in the above-identified patent and that said Letters Patent are hereby corrected as shown below:

Column 1, line 57, "cumbersone" should be --cumbersome--.
Column 3, line 11, "sulphur-prisoned" should be --sulphur-poisoned--.

Column 4, line 51, "101" should be --1:1--.

Signed and Sealed this

*Sixth* Day of *May 1980*

[SEAL]

*Attest:*

SIDNEY A. DIAMOND

*Attesting Officer* *Commissioner of Patents and Trademarks*